United States Patent

Schmidt

[15] 3,669,381

[45] June 13, 1972

[54] TAPE RECORDER REELING CONTROL DEVICE

[72] Inventor: Gunter-Karl Schmidt, Constance, Germany

[73] Assignee: LICENTIA Patent-Verwaltungs-GmbH, Frankfurt am Main, Germany

[22] Filed: Dec. 21, 1970

[21] Appl. No.: 99,813

[30] Foreign Application Priority Data

Dec. 19, 1969 Germany......................P 19 63 687.4

[52] U.S. Cl.................................242/182, 242/76, 242/189, 226/118

[51] Int. Cl.....................................G11b 15/58, G11b 23/12

[58] Field of Search................................242/54.1, 182–191, 242/76, 75.4; 226/95, 97, 118

[56] References Cited

UNITED STATES PATENTS

| | | | |
|---|---|---|---|
| 3,016,207 | 1/1962 | Comstock | 242/183 |
| 3,134,528 | 5/1964 | Dickey | 226/97 |
| 3,525,480 | 8/1970 | Willard | 242/183 |
| 3,584,805 | 6/1971 | Lee | 242/184 |

*Primary Examiner*—Leonard D. Christian
*Attorney*—Spencer & Kaye

[57] ABSTRACT

In a tape recorder tape reeling device including a plurality of buffer chambers each for containing a pneumatically drawn tape loop forming part of a buffering length of tape between a transducer head and a reel, a tape tension sensor supporting the tape between such loops and providing an indication of the pneumatic attraction forces applied to such loops and hence of the length of the loops in the chambers.

3 Claims, 1 Drawing Figure

PATENTED JUN 13 1972 3,669,381
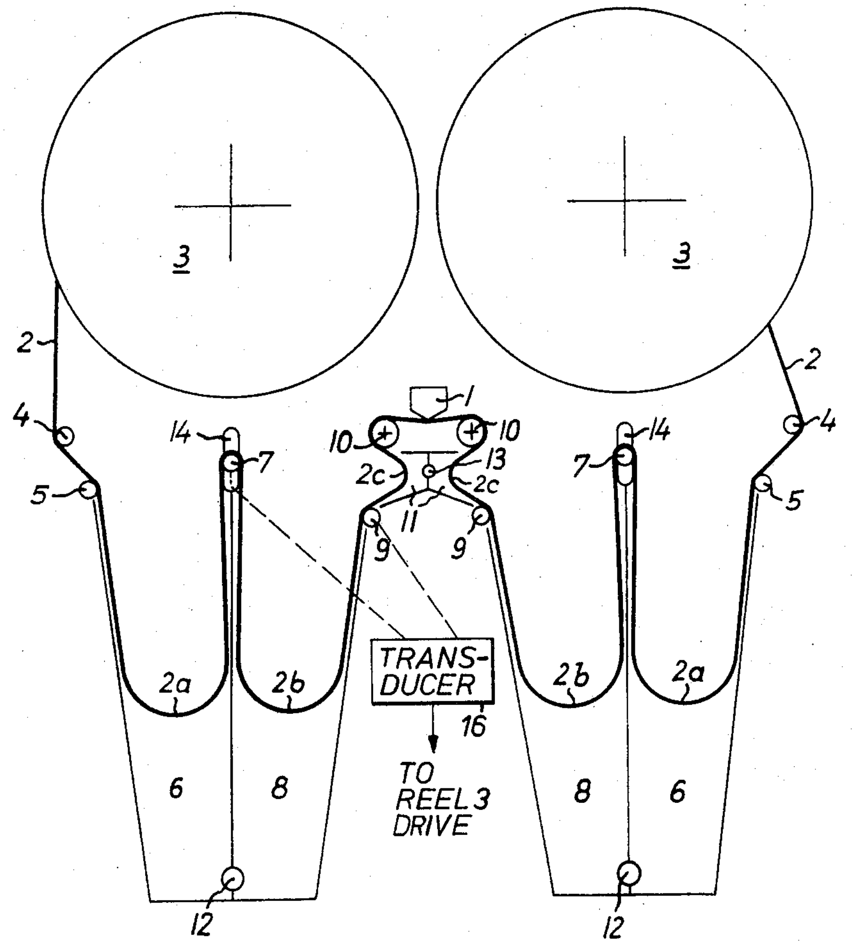
Inventor:
Günter-Karl Schmidt
BY Spencer & Kaye
ATTORNEYS.

TAPE RECORDER REELING CONTROL DEVICE

BACKGROUND OF THE INVENTION

The present invention relates to the control of tape movement in tape recorders, particularly of the type employed in data processing systems.

In the operation of magnetic tape recorders, particularly those that serve as a digital data memory, it is already known to form a pneumatically pulled buffer tape loop in a chamber disposed between a drive roller effecting the actual operating drive of the tape past a head and a reeling device which takes up or unreels the required supply of tape. Such a loop permits rapid changes in the speed and drive direction of the operating drive while allowing for a slower follow-up of the reeling device, the speed of the follow-up being controlled in dependence on the length of the buffer loop.

A pneumatic loop chamber, i.e. one which forms the loop by suction, permits more rapid changes in the loop length as compared with tape tensioning levers. It is also already known to construct a pneumatic loop chamber in such a manner that it becomes narrower in the direction from the opening where the loop enters so that the tape tensioning force varies in dependence on the depth of the tape loop in the chamber.

A tape tension characteristic dependent on the length of the loop can also be realized, however, by the particular design of the cross section through which ambient air flows into the chamber at subatmospheric pressure to pull the loop. It is also known, particularly to avoid the need for very long chambers, to divide the buffering length into at least two consecutive tape loops which are each pneumatically pulled in a chamber, the loop chambers again being designed to produce the desire varying tape tensioning characteristic.

When dividing the buffering length of tape into a plurality of pneumatically pulled loops, difficulties and increased expenditures are encountered in the derivation of control values for the winding drive when the loop position is sensed according to current techniques.

SUMMARY OF THE INVENTION

It is an object of the present invention to eliminate these drawbacks and difficulties.

The objects of the present invention are achieved by the provision of a novel device in a tape recorder for controlling a reeling device in dependence on the fill level of a plurality of buffer chambers by means of which a buffering length of tape is divided into a plurality of pneumatically pulled tape loops.

According to the present invention this device is composed of a tape tension sensor disposed between two loops and having the tape guided over it.

The present invention further provides that when more than two consecutive, pneumatically formed loops are provided, the tape is always guided over a tape tension sensor between two of the loops and the tape tension values derived therefrom are made effective for controlling of the winding device.

In one embodiment of the invention, the tape tension sensor includes a tape guide element which can be deflected by the tape tension forces against a counterforce, and means for emitting control signals which depend on the amount of deflection of the tape guide element.

It may also be provided that the tape tension sensing is effected with the aid of a stream of air which guides the tape.

BRIEF DESCRIPTION OF THE DRAWINGS

The drawing FIGURE is an elevational view of one preferred embodiment of the invention.

DESCRIPTION OF THE PREFERRED EMBODIMENTS

The drawing FIGURE shows the tape delivery and control system of a magnetic tape recorder of the type employed for digital memories in which the magnetic tape is operated substantially in the same manner in either feed direction and identically constructed tape movement devices are provided on both sides of the magnetic head arrangement 1. Each tape movement device can take over either the take-up or unreeling function depending on the direction of movement of the tape. The system is thus bilaterally symmetrical, at least in function, and the elements which are thus symmetrical with one another with respect to a vertical plane bisecting the device are given the same reference numerals since they too are interchangeable as regards their function.

The magnetic tape 2 is guided from a supply reel 3 around guide rollers 4 and 5 into a first buffer chamber 6 which narrows progressively in the direction of movement of the tape as it enters the chamber. The tape then moves over a guide roller 7 into a further buffer chamber 8 which is immediately adjacent buffer chamber 6 and which becomes narrower in the same manner and direction as buffer chamber 6. From there the tape moves over a guide roller 9 to a roller 10.

The two rollers 10 are controlled to rotate in respectively opposite directions, the right-hand roller, for example, rotating clockwise, and are provided, for example, with suction openings through which the tape can be pulled to the roller to a greater or lesser degree by an adjustable suction force. Thus, a strong suction force can be applied through one roller which is to operate as a drive roller and which pulls the magnetic tape past the magnetic head arrangement 1, while the other roller 10 applies a lesser suction force and acts as a brake or tension roller.

Between guide roller 9 and roller 10 the tape passes through a buffer chamber 11 which is substantially smaller than buffer chambers 6 and 8. In buffer chambers 6, 8 and 11 the magnetic tape is pulled into loops **2*a*, 2*b* and 2*c* through the effect of air evacuation lines which communicate with the chambers via openings 12 and 13, these loops together forming a buffering length of tape between roller 10 and supply reel 3. The major portion of this buffering tape length is formed by loops 2*a* and 2*b* which serve to provide a suitable amount of slack in the tape portion which is intermittently driven with rapid changes in speed and the winding reel, while the smaller tape loop 2*c* provides a further slack between the intermittently operating tape portion and the tape lengths 2*b* and 2*a***.

The narrowing of the buffer chambers 6 and 8 in the direction of formation of the tape loop therein has the result that the tape tension, which is controlled by the vacuum pressure below the loop and the cross-sectional area over which this pressure is effective, decreases when the base of the loop moves toward the bottom of the chamber and becomes tighter when the loop base moves upwardly. The smaller chamber 11 may advantageously also be designed according to this principle.

The guide roller 7 over which the tape 2 is pulled in passing between loops **2*a* and 2*b*, is a component of a tape tension sensor. For this purpose it may be slidably mounted in a longitudinal slot 14, and acted on by a spring force tending to move it upwardly. The tension forces produced at loops 2*a* and 2*b* by suction in chambers 6 and 8 together act on roller 7 and tend to pull it downwardly. The sum of these tension forces on loops 2*a* and 2*b* is a measure of the length of tape in the two buffer chambers 6 and 8 and can be determined by sensing the position of roller 7 and converting the position indication into an analog or digital value signal which serves to control the winding or unwinding speed of the corresponding winding reel 3 to tend to maintain a constant length of tape between the reel and the head 1**.

A measurement of the sum of the tape tension forces of loops **2*a* and 2*b* may also be accomplished, if desired, in conjunction with extremely slight deflections of guide roller 7 or by means of a nonrotatable guide element provided in place of the roller and arranged to contact, for example, a deformable body such as a bending bar whose deformations are measured by an extension indicator strip or by a suitably designed pressure box. It is also possible to replace the guide roller 7** forming the abutment for the tension forces of the loops by a stream of air which the tape influences, in reacting to the outflowing air so that the tape tension can be measured.

If more than two pneumatically pulled tape loops are to be considered for the formation of the control values, for example in the illustrated embodiment additionally loop 2c, a tape tension sensor should be arranged between each two consecutive tape loops - in the embodiment guide roller 9 would then be a part of such a tape tension sensor - and the sum of the values provided by the tape tension sensors must be formed, preferably by electronic means, to produce the desired control signal. Thus, the rollers 7 and 9 are shown operatively linked to a transducer 16 which converts the roller deflections into a signal which controls the direction and speed of rotation of the associated reel 3. Transducer 16 can be constituted by any well-known device suitable for the purpose.

It will be understood that the above description of the present invention is susceptible to various modifications, changes and adaptations, and the same are intended to be comprehended within the meaning and range of equivalents of the appended claims.

I claim:

1. In a tape recorder tape reeling device including a plurality of buffer chambers each for containing a pneumatically drawn tape loop forming part of a buffering length of tape, the improvement comprising a tape tension sensor supporting the tape between two such loops and providing an indication of the pneumatic tension forces applied to such loops.

2. An arrangement as defined in claim 1 wherein there are more than two consecutive, pneumatically formed loops and there are a plurality of said tape tension sensors each supporting said tape between a respective pair of adjacent loops, and the tape tension indications provided by said sensors are combined for controlling the reeling device.

3. An arrangement as defined in claim 1 wherein said tape tension sensor comprises a tape guide element arranged to be deflected by the tape tension forces against a counterforce, and means connected to said element for emitting control signals which depend on the degree of deflection of said tape guide element.

* * * * *